(12) United States Patent
Sano

(10) Patent No.: US 6,927,016 B2
(45) Date of Patent: Aug. 9, 2005

(54) BLANK DISC AND DIRECT STAMPER AND ITS MANUFACTURING METHOD

(75) Inventor: Kazuhiko Sano, Hyogen-Ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 43 days.

(21) Appl. No.: 10/279,623

(22) Filed: Oct. 23, 2002

(65) Prior Publication Data

US 2003/0087186 A1 May 8, 2003

(30) Foreign Application Priority Data

Oct. 23, 2001 (JP) ........................................ 2001-324707
Feb. 27, 2002 (JP) ........................................ 2002-051549

(51) Int. Cl.[7] ................................................. G03C 5/00
(52) U.S. Cl. ...................... 430/321; 430/325; 430/328; 430/330; 430/945
(58) Field of Search ............................... 430/321, 322, 430/325, 945, 331, 328, 330

(56) References Cited

U.S. PATENT DOCUMENTS

| | | | | |
|---|---|---|---|---|
| 4,729,940 A | * | 3/1988 | Nee et al. .................... | 205/655 |
| 5,805,563 A | | 9/1998 | Nakano | |
| 6,159,664 A | | 12/2000 | Reuhman-Huisken et al. | |

FOREIGN PATENT DOCUMENTS

| | | | |
|---|---|---|---|
| JP | 52-110011 | 9/1977 | |
| JP | 58-077044 | 5/1983 | |
| JP | 01-143039 | 6/1983 | |
| JP | 58-153242 | 9/1983 | |
| JP | 60-195749 | 10/1985 | |
| JP | 04-144230 | 5/1992 | |
| JP | 07-169671 | 7/1995 | |
| JP | 07-201085 | 8/1995 | |
| JP | 07-201990 | 8/1995 | |
| JP | 07-263298 | 10/1995 | |
| JP | 07-296427 | 11/1995 | |
| JP | 07-297113 | 11/1995 | |
| JP | 07-302443 | 11/1995 | |
| JP | 07-326077 | 12/1995 | |
| JP | 409007235 A | * 1/1997 | ............ G11B/7/26 |
| JP | 09-501534 | 2/1997 | |
| JP | 10-012534 | 1/1998 | |
| JP | 2735569 | 4/1998 | |
| JP | 10-092013 | 4/1998 | |
| JP | 2765421 | 6/1998 | |
| JP | 11-074176 | 3/1999 | |
| JP | 2000-021033 | 1/2000 | |
| JP | 2000-089471 | 3/2000 | |
| JP | 2001-110101 | 4/2001 | |
| JP | 2001-202661 | 7/2001 | |
| WO | WO 95/34894 | 12/1995 | |

* cited by examiner

*Primary Examiner*—Thorl Chea
(74) *Attorney, Agent, or Firm*—Amster, Rothstein & Ebenstein LLP; Abraham Kasdan; Jung S. Hahm

(57) ABSTRACT

A method for manufacturing a direct stamper to be used for molding optical discs, includes forming a layer of a crosslinkable substance all over a surface of a base disc, subjecting the crosslinkable substance to a first crosslinking reaction, thereafter, forming a photoresist layer on the crosslinking substance, subsequently, subjecting the photoresist layer to exposure to a laser beam having been modulated by a signal to be recorded, and then to development, so that exposed portions of the photoresist are formed into bumps on the crosslinking substance, and thereafter, further subjecting the crosslinking substance and the photoresist bumps to a second crosslinking reaction.

7 Claims, 11 Drawing Sheets

BLANK DISC AND DIRECT STAMPER AND ITS MANUFACTURING METHOD

BACKGROUND OF THE INVENTION

The present invention relates to an optical disc, a direct stamper to be used in molding optical discs, and a method for manufacturing the direct stamper.

Conventionally, stampers for manufacturing optical discs have been manufactured by so-called mastering process. This manufacturing process generally employs a technique so called photolithography, starting with the formation of a pits-and-bumps pattern of photoresist corresponding to signals on a glass disc. A positive-type photoresist layer on a glass disc is exposed spirally to a laser beam whose intensity is modulated in response to a signal which is to be recorded, and then subjected to development, by which pits of the resist are formed in track shapes. Thereafter, an electrically conductive film is formed on the surface, and a nickel thick film is formed by electroforming further thereon. The thick film, which is about 0.3 mm thick, is stripped from the original glass disc, by which a stamper is obtained. In this nickel disc, bumps to which pits of the photoresist have been transferred are formed in a spiral shape. By injection molding with this disc, an optical disc having bit strings containing information is made up.

The process for making this stamper includes 10 or more steps, taking much time and cost for manufacture. Further, such large numbers of steps would incur not a few defects due to dust or human errors or the like, resulting in lowered yields.

In recent years, it has been being attempted to make up a stamper without requiring such many steps but with fewer steps. Japanese Patent No. 2765421 discloses a manufacturing method which includes the steps of providing a crosslinkable inorganic or organic layer on a substrate, subjecting the substrate to irradiation of a laser beam that has been intensity-modulated with a recording signal and further to development so that bumps corresponding to a signal pattern are provided on the substrate, and further strengthening the bumps by heating, where the resulting substrate is then put into direct use as a stamper. The prior art is explained by referring to FIGS. 4A–4D. FIG. 4A shows a nickel substrate 1 and a crosslinkable inorganic or crosslinkable organic substance layer 2. FIG. 4B shows a state that the crosslinkable substance 2 is exposed to a signal-modulated laser beam 3 that has been converged by a recording lens 4. FIG. 4C shows a state that exposed portions as a latent image of laser exposure are locally heated, thereby crosslinked, to form marks 5. Through development of this, unexposed portions are dissolved, while the exposed portions alone remain as 6. The crosslinking substance 2 of these has an action of so-called negative-type resist. As used herein, the term "crosslinking substance" refers to a crosslinkable substance that has been at least partially crosslinked. FIG. 4D represents the substrate in the finished state. When this substrate is subjected to hard baking process at a high temperature of 300° C., the mark portions 6 are promoted to be further crosslinked, and thereby strengthened. The substrate made in this way is put into direct use as a stamper. Therefore, this stamper is called direct stamper.

Also, Unexamined Japanese Patent Publication No. 7-326077 discloses a method which includes the steps of forming bumps of photoresist (crosslinking substance) on a substrate, and subjecting the substrate to high-temperature heating to accelerate its crosslinking, where the resulting substrate is then directly used as a stamper. The method of this patent publication differs from that of Japanese Patent No. 2765421 in the following points. That is, photoresist is selectively exposed to light so as to generate an acid. Thereafter, heating the whole substrate causes the acid to act as a catalyst, which causes crosslinking to occur to the exposed portions alone. Next, subjecting the whole substrate to exposure to light causes an acid to be generated at portions which have not been exposed at the preceding time, and the unexposed portions, to which crosslinking has not occurred, are dissolved by the developer. Thus, the portions that have first been exposed to light remain as bumps.

However, prior-art direct stampers are in either case such that bumps of organic or inorganic photoresist (crosslinking substance) are formed directly on a nickel substrate. Because of this, although the photoresist is enhanced in hardness by high-temperature baking, yet the bonding strength between the photoresist and metal is not so high inherently. Also, in the case of DVDs, photoresist bumps are 0.3 µm wide and, at the shortest, 0.4 µm long, hence very small in bonding area.

Each of these direct stampers, when set to a mold of a molding machine, forms a cavity with a mirror-surface mold. High-temperature resin is injected thereinto at high pressure. In this operation, the high-pressure resin exerts an action of stripping photoresist bumps off.

Whereas the mold temperature is generally set at around 100° C., the resin to be injected is at a high temperature of about 300° C. or more. Thermal expansion and contraction are repeated, where the surface temperature of the direct stamper is elevated by resin injection and returned to the original temperature by extraction of a molded disc (optical disc). There is a large difference in coefficient of thermal expansion between nickel or other like metals and photoresist, and stress due to the difference in coefficient of thermal expansion repeatedly acts on the photoresist bumps so that the photoresist bumps might be finally stripped from the substrate.

In molding of DVDs (optical discs) with the prior-art direct stamper, regenerative signal errors of the DVDs due to losses of photoresist bumps would reach a permissible limit value at around 5000 shots of molding. In the case of DVDs, an error due to defects is called PI error, which is determined to be 280 or less in 8ECC blocks before error correction. Because of this, the molding of DVDs (optical discs) with the prior-art direct stamper has been incapable of molding of about 5000 shots or more.

SUMMARY OF THE INVENTION

Accordingly, an object of the present invention is to solve these and other issues and to provide a blank disc for making a direct stamper, the direct stamper, and a manufacturing method therefor, capable of preventing resist bumps from being formed into foot-spread (wide-based) cross-sectional configurations.

In accomplishing these and other aspects, according to a first aspect of the present invention, there is provided a method for manufacturing a direct stamper to be used for molding optical discs, comprising:

forming a layer of a crosslinkable substance all over a surface of a base disc;

subjecting the crosslinkable substance to a first crosslinking reaction;

thereafter, forming a photoresist layer on the crosslinking substance;

subsequently, subjecting the photoresist layer to exposure to a laser beam having been modulated by a signal to be recorded, and then to development, so that exposed portions of the photoresist are formed into bumps on the crosslinking substance; and thereafter, further subjecting the crosslinking substance and the photoresist bumps to a second crosslinking reaction.

According to a second aspect of the present invention, there is provided a direct stamper manufacturing method according to the first aspect, wherein the first crosslinking reaction of the crosslinkable substance is a crosslinking reaction of such an extent that the crosslinking substance is substantially not attacked by a solvent contained in the photoresist, where a film decrement of the crosslinking substance due to the photoresist is not more than 5 nm.

According to a third aspect of the present invention, there is provided a direct stamper manufacturing method according to the first or second aspect, wherein the first crosslinking reaction of the crosslinkable substance is implemented by subjecting the crosslinkable substance to a baking process, or an ultraviolet irradiation and a subsequent baking process on the crosslinkable substance.

According to a fourth aspect of the present invention, there is provided a direct stamper manufacturing method according to the first or second aspect, comprising:

forming a photoresist layer on a crosslinking substance layer;

subjecting the photoresist layer to exposure to a laser beam which has been modulated by a signal to be recorded and which has been converged to a minute spot by a recording lens, thereby recording a latent image spirally on the photoresist layer;

thereafter, subjecting the photoresist layer to a post-exposure baking process and then to development; and removing portions of the photoresist layer other than its exposed portions so that bumps of the photoresist are formed on the crosslinking substance.

According to a fifth aspect of the present invention, there is provided a direct stamper manufacturing method according to the first or second aspect, wherein the second crosslinking reaction is a process of exposing the crosslinking substance and the photoresist bumps to plasma, where the plasma processing causes a mutual crosslinking reaction between the crosslinking substance and the photoresist bumps and concurrently further accelerates crosslinking reactions of the crosslinking substance itself and the photoresist bumps themselves, respectively.

According to a sixth aspect of the present invention, there is provided a direct stamper manufacturing method according to the fifth aspect, wherein the plasma processing is a plasma processing using fluorine gas.

According to a seventh aspect of the present invention, there is provided a direct stamper manufacturing method according to the first or second aspect, wherein the second crosslinking reaction is a process of subjecting the crosslinking substance and the photoresist bumps to ultraviolet irradiation and baking, where the ultraviolet irradiation and the baking process cause a mutual crosslinking reaction between the crosslinking substance and the photoresist bumps and concurrently further accelerate crosslinking reactions of the crosslinking substance itself and the photoresist bumps themselves, respectively.

According to an eighth aspect of the present invention, there is provided a direct stamper manufacturing method according to the first or second aspect, wherein the crosslinkable substance and the photoresist are of an identical substance.

According to a ninth aspect of the present invention, there is provided a direct stamper manufacturing method according to the first or second aspect, wherein the photoresist is a negative-type resist.

According to a 10th aspect of the present invention, there is provided a direct stamper manufacturing method according to the first or second aspect, wherein material of the base disc is nickel.

According to an 11th aspect of the present invention, there is provided a direct stamper manufacturing method according to the first or second aspect, wherein a surface of the base disc to be brought into contact with the crosslinkable substance is processed so as to have pits and bumps of not less than 1 nm and not more than 10 nm.

According to a 12th aspect of the present invention, there is provided a blank disc for a direct stamper which is formed through subjecting a photoresist layer formed on a crosslinking substance layer to exposure to a laser beam having been modulated by a signal to be recorded, and then to development, to thereby form photoresist bumps, further making the photoresist bumps crosslinked and thereby strengthened, thus making the base disc into the direct stamper serving for directly molding optical discs, the blank disc comprising:

a layer of a crosslinkable substance formed on a surface of the base disc; and a layer of the photoresist formed on the crosslinkable substance that has been treated into a partially crosslinked state.

According to a 13th aspect of the present invention, there is provided a blank disc for a direct stamper according to the 12th aspect, wherein the partially crosslinked state is achieved by a crosslinking reaction of such an extent that the crosslinking substance is not attacked by a solvent contained in the photoresist.

According to a 14th aspect of the present invention, there is provided a blank disc for a direct stamper according to the 12th or 13th aspect, wherein the crosslinkable substance and the photoresist are of an identical substance.

According to a 15th aspect of the present invention, there is provided a direct stamper for molding optical discs, comprising:

a crosslinkable substance layer formed on a surface of a base disc, crosslinkable substance of the crosslinkable substance layer being then subjected to a first crosslinking reaction;

a photoresist layer formed thereafter on the crosslinking substance; and bumps formed of exposed portions of the photoresist on the crosslinkable substance by subsequently subjecting the photoresist layer to exposure to a laser beam modulated by a signal to be recorded, and to development, the crosslinking substance and the photoresist bumps being then further subjected to a second crosslinking reaction.

According to a 16th aspect of the present invention, there is provided a direct stamper according to the 15th aspect, wherein the photoresist layer is formed on the crosslinking substance layer, the photoresist layer being then subjected to exposure to the laser beam which has been modulated by the signal to be recorded and which has been converged to a minute spot by a recording lens, by which a latent image is recorded spirally on the photoresist layer; and the bumps of the photoresist are formed on the crosslinking substance by subsequently subjecting the photoresist layer to a post-exposure baking process and then to development and further removing portions of the photoresist layer other than its exposed portions.

According to a 17th aspect of the present invention, there is provided a direct stamper according to the 15th or 16th aspect, wherein the second crosslinking reaction is a process of exposing the crosslinking substance and the photoresist bumps to plasma, where the plasma processing causes a mutual crosslinking reaction between the crosslinking substance and the photoresist bumps and further accelerates crosslinking reactions of the crosslinking substance itself and the photoresist bumps themselves, respectively.

According to an 18th aspect of the present invention, there is provided a direct stamper according to the 15th or 16th aspect, wherein the second crosslinking reaction is a process of subjecting the crosslinking substance and the photoresist bumps to ultraviolet irradiation and baking, where the ultraviolet irradiation and the baking process cause a mutual crosslinking reaction between the crosslinking substance and the photoresist bumps and further accelerate crosslinking reactions of the crosslinking substance itself and the photoresist bumps themselves, respectively.

According to a 19th aspect of the present invention, there is provided a direct stamper according to the 15th or 16th aspect, wherein the crosslinkable substance and the photoresist are of an identical substance.

According to a 20th aspect of the present invention, there is provided a direct stamper according to the 15th or 16th aspect, wherein the photoresist is a negative-type resist.

According to a 21st aspect of the present invention, there is provided a direct stamper according to the 15th or 16th aspect, wherein material of the base disc is nickel.

According to a 22nd aspect of the present invention, there is provided a direct stamper according to the 15th or 16th aspect, wherein a surface of the base disc to be brought into contact with the crosslinkable substance is processed so as to have pits and bumps of not less than 1 nm and not more than 10 nm.

According to a 23rd aspect of the present invention, there is provided an optical disc for being molded by a direct stamper, the direct stamper comprising:

a crosslinkable substance layer formed on a surface of a base disc with crosslinkable substance of the crosslinkable substance layer being subjected to a first crosslinking reaction;

a photoresist layer formed on the crosslinking substance; and bumps formed of exposed portions of the photoresist on the crosslinking substance by subsequently subjecting the photoresist layer to exposure to a laser beam modulated by a signal to be recorded, and then to development, the crosslinking substance and the photoresist bumps being then further subjected to a second crosslinking reaction.

As a result, the bond between the bump-shaped cross-linked photo-resist and the cross-linked substrate can be strengthened. Therefore, in the molding of optical discs (for example, DVDs) using the direct stamper having a bump-shaped cross-linked photo-resist, it becomes implementable to prevent regenerative signal errors of optical discs such as DVDs due to losses of the bump-shaped cross-linked photo-resist of the direct stamper even in the molding of optical disks such as DVDs at 100,000 shots or more.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1A:
FIGS. 1A, 1B, 1C, 1D, 1E, 1F, 1G, 1H, 1I and 1J are views showing direct stamper manufacturing methods according to first and second embodiments of the present invention.

Before the description of the present invention proceeds, it is to be noted that like parts are designated by like reference numerals throughout the accompanying drawings.

Embodiments of the present invention are shown in FIGS. 1 through 3, FIGS. 5 through 6, and FIGS. 9 through 11.
(First Embodiment)

FIGS. 1A to 1J show a direct stamper manufacturing method according to a first embodiment of the present invention.

FIG. 1A is a view showing a state in which a crosslinkable substance 12 (e.g., 0.1 $\mu$m thick) is applied onto a base disc 11 of nickel or the like. The crosslinkable substance 12 is exemplified by organic polymers or silicon oxide's inorganic materials or the like. In this embodiment, the crosslinkable substance 12 is an organic polymer. Also, the base disc 11 is made of nickel in the first embodiment, but otherwise may be given by such metals as nickel alloys, silicon, aluminum and copper, or by glass, ceramics, or the like.

Figure 1B:
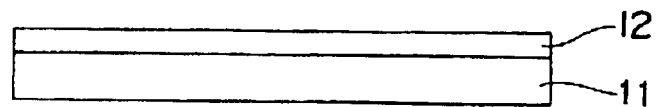
Figure 1C:
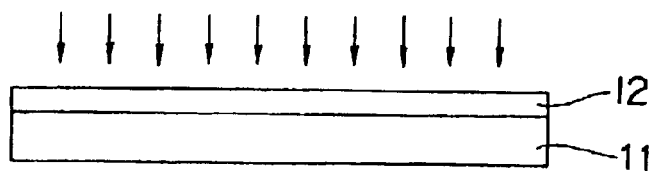
Figure 1D:
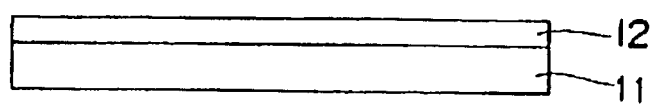

First of all, in the case where the crosslinkable substance 12 is a chemical-amplification type resist or the like, after the application of the crosslinkable substance 12, baking process as shown in FIG. 1B is first performed as a pre-baking aimed at evaporating a solvent of the crosslinkable substance 12 at a relatively low temperature of 80° C. to 90° C. Subsequently, as shown in FIG. 1C, ultraviolet radiation is applied to the entire base disc 11, and through a baking process shown in FIG. 1D, by which polymer chains of the crosslinkable substance 12 are bridged. The ultraviolet radiation used is that of a low-pressure mercury lamp having a wavelength of 254 nm. As to the wavelength of the ultraviolet radiation, it is necessary to select an optimum wavelength depending on the crosslinking substance used. For phenol resins, ultraviolet radiation of around 300 nm wavelengths is effective for crosslinking. FIG. 1D shows a baking after the exposure, which is so called post-exposure baking. In this process, a first crosslinking reaction occurs to the crosslinkable substance 12, where the acid that has been generated by the exposure serves as a catalyst.

In some cases, the crosslinkable substance 12 may crosslink by heat. In this case, the ultraviolet radiation step of FIG. 1C and the post-exposure baking step of FIG. 1D are omitted, and the first crosslinking reaction of the crosslinkable substance 12 is caused only by the baking process of FIG. 1B.

In either case, the first crosslinking reaction of the crosslinkable substance 12 at this stage is intended not to fulfill a complete crosslinking but to render a partial crosslinking. The partial crosslinking is of such a degree that when photoresist 13, which is a second crosslinkable substance, is applied onto the crosslinking substance 12 at the step of subsequent FIG. 1E, the crosslinking substance 12 does not dissolve into the solvent of the photoresist 13, more specifically, a film decrement of the crosslinking substance is not more than 5 nm. That is, the crosslinking substance 12 is crosslinked to such an extent as substantially not to be attacked by the solvent of the photoresist 13, which is the second crosslinkable substance. Generally, organic polymers become insoluble in a solvent as crosslinking progresses to several percents.

Figure 1E:
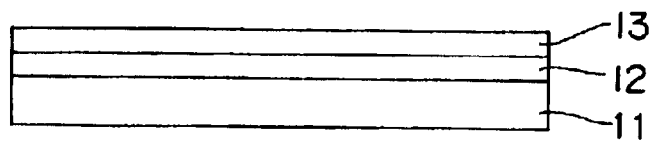

The photoresist 13, a second crosslinkable substance, used in FIG. 1E is a negative-type resist. However, even in the case where the photoresist 13 is given by a positive-type resist, the photoresist 13 may be used as a negative-type one by a method known as so-called image reversal method. Whichever the photoresist 13 is, the crosslinking substance 12, which has been crosslinked to several percents, is never attacked by the solvent of the photoresist 13. The base resin of the resist used in this case is novolac-type phenol resin.

Figure 1F:
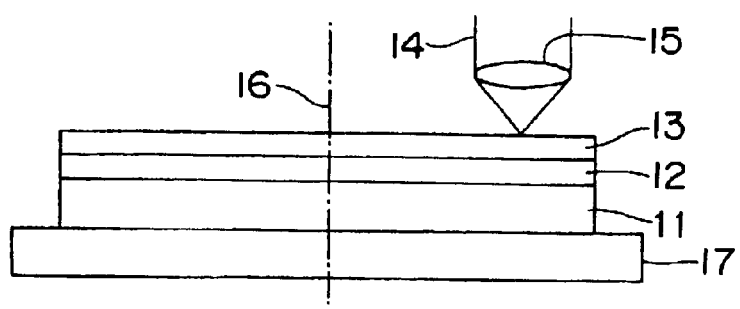

Next, as shown in FIG. 1F, the photoresist 13 is exposed to a laser beam 14 modulated by a signal which is to be recorded. The apparatus used in this process is one called laser beam recorder, and only partly shown in the figure including the laser beam 14 that has already been modulated by a signal to be recorded, a recording lens 15 for converging the laser beam 14 to a fine spot of 0.3µ or so, and a rotation driving member 17 for rotating the base disc 11 around a rotating shaft 16. Since the recording lens 15 moves along a radial direction of the base disc 11 that is rotating, a latent image is recorded spirally in the layer of the photoresist 13.

Figure 1G:
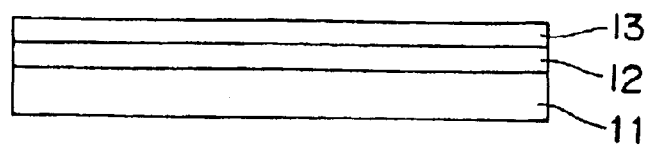

FIG. 1G is a view showing a baking process after the exposure. In this baking process, while the acid generated at exposed portions of the photoresist 13 by the exposure acts as a catalyst, crosslinking reaction occurs to the exposed portions of the photoresist 13, which is the second crosslinkable substance. This photoresist 13 is a resist of the type which is generally called chemical-amplification type resist. In addition, in some types of photoresist, the need for post-exposure baking is eliminated.

Figure 1H:
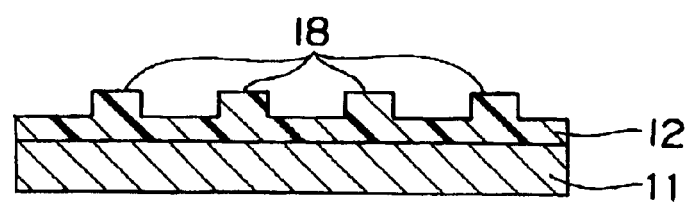
Figure 1:
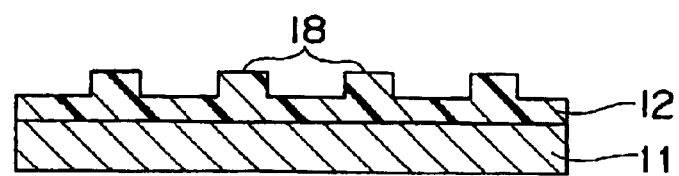

FIG. 1H is a view showing a state that portions of the photoresist 13 other than its crosslinked portions have been fused and flown away as a result of a subsequent development process. In this first embodiment, the development process is performed by alkaline solution. As a result of this, the exposed portions of the photoresist remain as bumps 18. In this state, the bumps 18 of the photoresist, which is the second crosslinking substance, and the crosslinking substance layer 12 have not yet been strongly bonded together.

FIG. 1I shows a step of further accelerating the crosslinking between the layer of the crosslinking substance 12 and the photoresist of the bumps 18. In the step of FIG. 1H, as described before, the layer of the crosslinking substance 12 has not yet been crosslinked completely. Also, the crosslinking of the second-crosslinking-substance photoresist of the bumps 18 exposed to the recording laser have progressed only partly. By making the crosslinking of the two members further progress as a second crosslinking reaction by the step of FIG. 1I, mutual crosslinking between the second-crosslinking-substance photoresist polymer of the bumps 18 and the layer of the crosslinking substance 12 is caused to occur, strengthening the bond therebetween. Also, by the crosslinking of the crosslinking substance 12 itself and the bumps 18 themselves of the second crosslinking substance, the structures of the two members are even further strengthened, giving such a strength that the members can withstand heat and stress involved in the molding.

One of concrete methods for this acceleration of crosslinking reaction (second crosslinking reaction) is to expose the post-development base disc as a whole into plasma. As the plasma for this method, using plasma obtained from fluorine gas and exposing the whole post-development base disc to the plasma showed high effects. Since exposing crosslinking substance (photoresist) into this plasma would cause the photoresist itself to be whittled by ions or radicals in the plasma, the plasma exposure time is set to several seconds or so. The crosslinking substance and the bumps of the second-crosslinking-substance photoresist subjected to plasma processing for several seconds in this way are hardened to their interiors. After the plasma processing by fluorine gas, a comparison of etching rate of the crosslinking substances showed nearly 180 times larger hardnesses than those without plasma processing when executed oxygen ashing. Further, heat-resistant temperature increases as well. Even heating to 250 to 300° C. caused no changes in the configuration of the bumps 18.

Figure 1J:
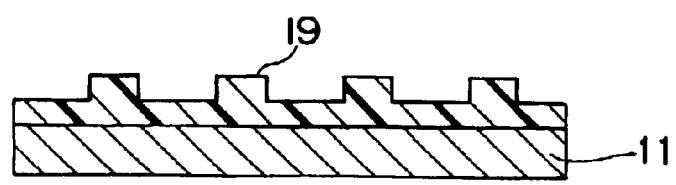

FIG. 1J is a view showing that the bumps 18 of photoresist, the second crosslinking substance and the layer of the crosslinking substance 12 have been formed into a monolithic structure 19 on the base disc 11. The base disc 11, on top of which the monolithic structure 19 is formed, is machined in its inner and outer diameters so as to match the mold of the molding machine, and then polished in its rear surface as required, by which a direct stamper is completed. In addition, these processes of machining may also be performed from the beginning.

Now, if the temperature of an interface between the stamper and molten resin injected to its top surface is expressed by T, then T can be determined by the following Equation 1:

$$T = \{\sqrt{(\rho_p \times C_p \times k_p)} \times T_{po} + \sqrt{(\rho_m \times C_m \times k_m)} \times T_{mo}\} / \{\sqrt{(\rho_p \times C_p \times k_p)} + \sqrt{(\rho_m \times C_m \times k_m)}\} \quad (1)$$

(where ρ denotes the volume density, C denotes the specific heat, and k denotes thermal conductivity, and where p represents the molten resin and m represents the direct stamper. Also, $T_{po}$ is the temperature of the molten resin and $T_{mo}$ is the initial temperature of the stamper.)

As to the temperature T of the interface of the molten resin, which varies depending on molding conditions, the temperature of the mold of the molding machine to which the stamper is to be fitted is set to around 100° C., and the temperature of the molten resin is set to around 360° C., in the case where a conventional nickel direct stamper is used. The temperature T of the interface between the stamper and the molten resin almost maintains the initial temperature of the stamper, being not more than 110° C., by virtue of the nickel's much larger thermal conductivity than resin. Therefore, the molten resin begins to cool and solidify from the moment that the molten resin has come into contact with the stamper surface.

In the case where the surface of the stamper is formed of the crosslinking substance and the second crosslinking substance (photoresist) as in the first embodiment, the surface temperature becomes higher than that of the foregoing case. As one working example, given that there are no differences in volume density, specific heat, and thermal conductivity between the resin and the direct stamper surface material, the temperature T of the interface of the molten resin is about 230° C. according to the above temperature settings. Further, in the first embodiment, since nickel as a heat sink is present under the crosslinking substance, the temperature would be further lower. In the direct stamper of the first embodiment, the bumps of the photo-resist and the crosslinking substance have a heat-resistant temperature of 250° C. or higher as a result of crosslinking as described above, and so prevented from deterioration due to the heat during the molding process.

(Second Embodiment)

A second embodiment of the present invention is the same as the first embodiment except the process part (i.e., the second crosslinking reaction) of accelerating the crosslinking between the layer of the crosslinking substance 12 and the resist of the bumps 18 of the second-crosslinking-substance photoresist as shown in FIG. 1I. In this method, the crosslinking substance and the bumps 18 of the second crosslinking substance on the base disc after development shown in FIG. 1H are subjected to ultraviolet irradiation or deep-ultraviolet irradiation, as well as baking process, by which the second crosslinking reaction between the photo-resist and the crosslinkable substances is accelerated.

In the case where the photo-resist and the crosslinking substance are chemical-amplification type resist, the second crosslinking reaction is accelerated by baking them after the ultraviolet irradiation.

In the case where the photo-resist and the crosslinking substances are novolac resin other than chemical-amplification type ones, deep ultraviolet irradiation, when applied in the state that moisture content in the resin had been dissipated by baking process, makes the second crosslinking reaction progress.

In the second embodiment of the present invention, with a chemical-amplification type resist used as the photoresist, deep ultraviolet radiation having a wavelength of 254 nm was applied to the post-development base disc, and thereafter a baking process at a temperature range of 150 to 250° C. was performed.

In this case also, like the working example of the first embodiment, crosslinking of the crosslinking substance and the bumps of the second-crosslinking-substance photoresist progressed, and the heat-resistant temperature of the base disc as a whole was not less than 250° C.

(Third Embodiment)

A third embodiment of the present invention is the same as the first embodiment except that the crosslinkable substance is the same substance as the second-crosslinking-substance photoresist. When photoresist of the same substance is used as the crosslinkable substance and thephotoresist, crosslinking therebetween occurs more easily, making the bonding strength between the two members is further increased. Furthermore, because of the same coefficient of thermal expansion, the two members are free from occurrence of shearing strain at the interface even if subjected to repeated thermal changes in the molding process, thus enhancing the durability to thermal changes.

(Fourth Embodiment)

Figure 2:
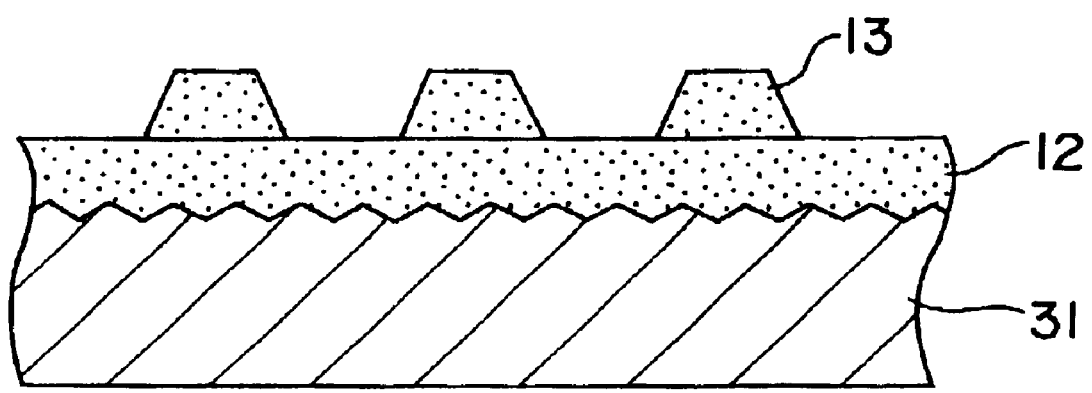
FIG. 2 is a conceptual view showing a cross section of a stamper having a base disc whose surface is pits-and-bumps shaped according to a fourth embodiment of the present invention.

A fourth embodiment of the present invention is the same as the first embodiment except that a surface of the base disc to be put into contact with the crosslinkable substance is pits-and-bumps shaped. FIG. 2 is a conceptual view showing a cross section of a stamper having a base disc 31 whose surface is pits-and-bumps shaped. In FIG. 2, the surface of the base disc 31 has minute pits and bumps. Therefore, the contact area between the crosslinkable substance layer 12 and the base disc 31 is increased, allowing the bonding strength therebetween to be increased. Thus, the stamper can withstand the shearing strain that occurs due to the difference in coefficient of thermal expansion between the base disc 31 and the crosslinking substance 12 with respect to the heat history during the molding process.

The method for giving the minute pits and bumps on the surface of the base disc 31 may be a method of exposing the base disc 31 into plasma of inert gas, where the minute pits and bumps are given by ion irradiation of the inert gas, or a method of giving the minute pits and bumps on the surface of the base disc 31 by chemical process, or the like. The size of the pits and bumps are within a range of 0.1 to 10 nm as an example.

(Fifth Embodiment of the Present Invention)

Figure 3A:
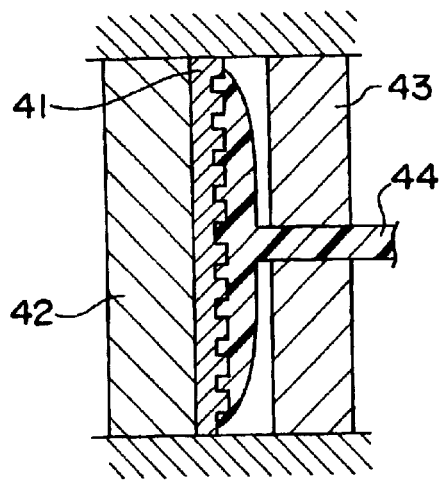
FIGS. 3A, 3B and 3C are schematic views of steps for making a disc from a direct stamper according to a fifth embodiment of the present invention.
Figure 3B:
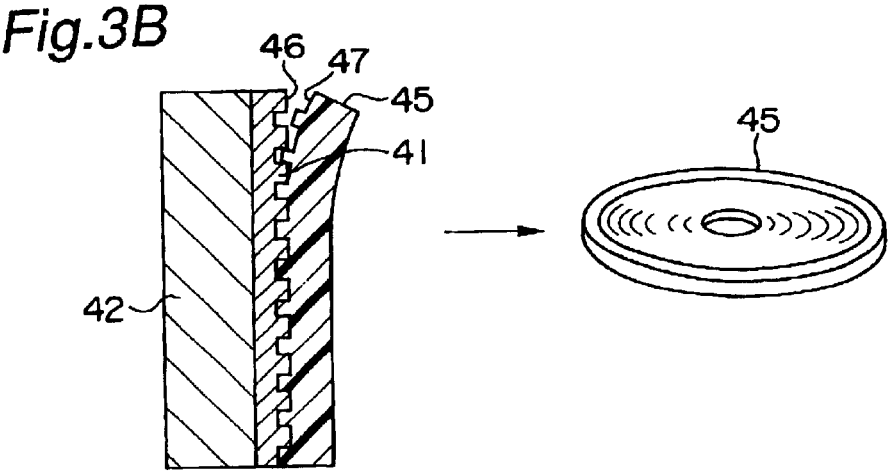
Figure 3C:
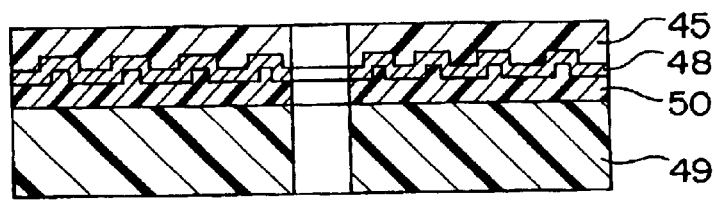

FIGS. 3A to 3C are views schematically showing the steps for making a disc from a direct stamper made by the above-described manufacturing method. FIG. 3A is a view showing resin injection in the disc. In FIG. 3A, the stamper 41 is a direct stamper made by the manufacturing method of the foregoing embodiments and shown in FIG. 1J or FIG. 2. The stamper 41 is fitted to a fixed mold 42 of a molding machine. A movable mold, denoted by numeral 43 is pressurized toward the mold 42 after resin 44 is injected into the mold.

FIG. 3B is a view showing a step of separating the disc from the direct stamper. In FIG. 3B, after the pressure-molding of the disc, the movable mold 43 is opened, and a replica disc 45 to which bumps 46 of the direct stamper 41 have been transferred as pits and which has been molded into a disc shape is separated from the direct stamper 41.

FIG. 3C is a schematic view showing a cross section of the completed replica disc. in FIG. 3C, although details are not shown, a recording layer or aluminum or other reflection layer 48 is attached to the replica disc 45 by sputtering process.

Figure 3D:
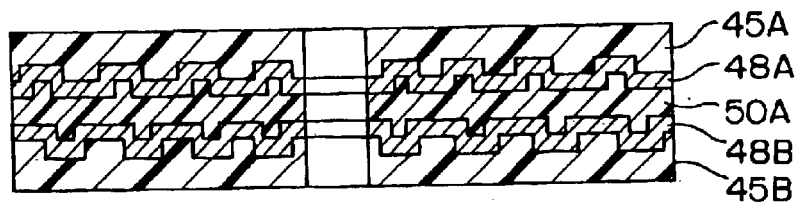
FIG. 3D is a schematic cross-sectional view of a disc made from a direct stamper according to another embodiment of the present invention.
Figure 4A:
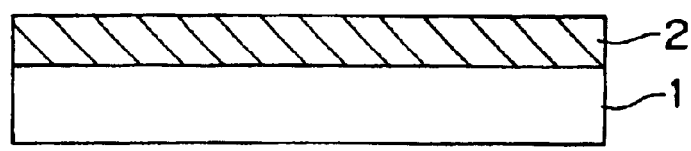
FIGS. 4A, 4B, 4C, and 4D are views showing a direct stamper manufacturing method according to a prior art.
Figure 4B:
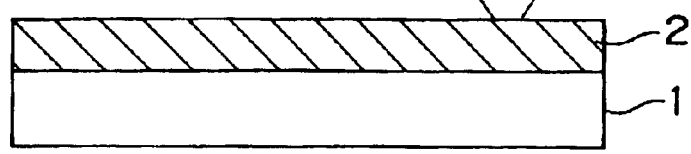
Figure 4C:
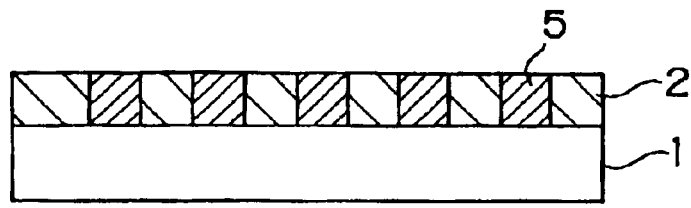
Figure 4D:
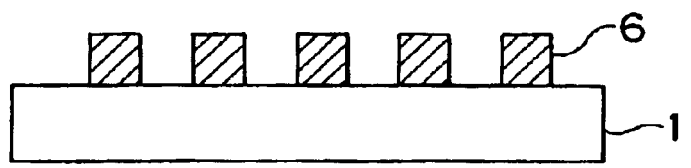

For CDs, a replica disc, which is 1.2 mm thick, is completed by laying an overcoat on the reflection film. For DVDs, a replica disc, which is 0.6 mm thick, is completed by making a dummy disc 49 bonded via an adhesion layer 50 to the replica disc on which a reflection film 48 has been overlaid with signals have not been recorded to the dummy disc. Also, there are other types of DVDs, including those which use no dummy disc with signals have been recorded on both sides in the DVDs as shown in FIG. 3D, or those in which signals of a two-layer disc are read from one side. FIG. 3D shows an example in which replica discs 45A, 45B with reflection films 48A, 48B overlaid thereon, respectively, are bonded together via the adhesion layer 50A. This is a disc capable of playback from both sides. Further, there are DVDs of a type that one of reflection films is semitransparent and two layers can be played back from one side.

In such a disc molding process as described above, the high-temperature resin 44 is injected into the mold, causing the stamper 41 to increase in temperature, and the replica disc 45 is separated from the stamper and thereafter exposed to an atmosphere of room temperature.

In conventional direct stampers, through this temperature cycle, shearing stress would act on boundary portions between the metallic base disc and the bumps of photoresist, which is a crosslinking substance, due to their expansion and contraction differences, which would finally result in occurrence of lacks of the photoresist bumps. As to these lacks of photoresist bumps, with the number of shots of molding beyond about 5000 shots, the PI error due to lacks of the photoresist bumps would be over the standard 280.

In the direct stamper of this embodiment, bumps of the second-crosslinking-substance photoresist are not fixed directly to the base disc, but fixed in a nearly monolithic structure onto the crosslinking-substance anchor coat provided on the base disc. Therefore, lacks of bumps in the molding process decrease to a large extent; by experiments, even molding of over 100,000 shots of molding resulted in no increase in the PI error. Thus, it becomes implementable to produce 100,000 discs at one time, the discs being stable in quality, and the manufacturing cost per disc can be suppressed low.

In the direct stamper according to the present invention, bumps of the second-crosslinking-substance photoresist representing signals of the disc are formed on the crosslinking substance provided all over the base-disc surface, and crosslinked and bonded to each other. Thus, the bumps are less liable to peeling against heat cycle or stress in the molding process. In the case where the crosslinkable substance is an organic polymer, its coefficient of thermal expansion has a value very close to that of the second-crosslinking-substance photoresist, so that the shearing strain occurring due to the expansion and contraction caused by the heat cycle in the molding process is small. Thus, the resist bumps are less liable to peeling in the molding process.

Accordingly, the direct stamper manufacturing method according to the present invention is greatly improved in the number of shots for the molding of replica discs, as compared with the conventional method of directly making a stamper. As a result of this, it becomes implementable to produce several ten thousands to several hundred thousands of discs with one stamper, and discs of constant quality and performance can be produced with low price.

(Sixth Embodiment)

Figure 7A:
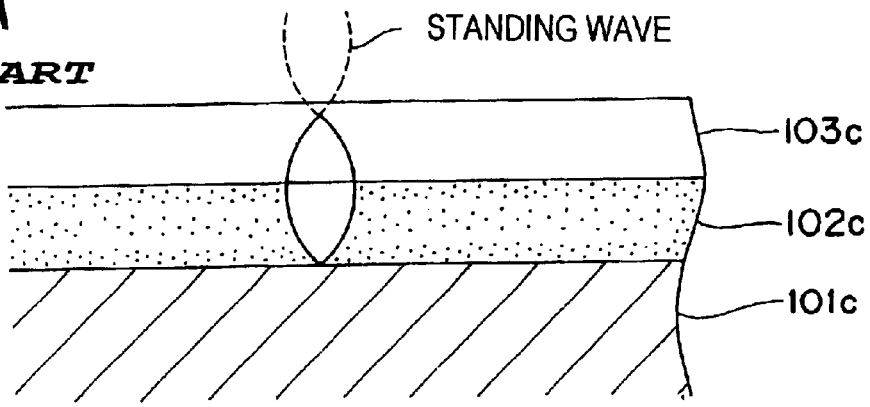
FIGS. 7A and 7B are schematic views of prior art examples each using a crosslinking substance layer.
Figure 7B:
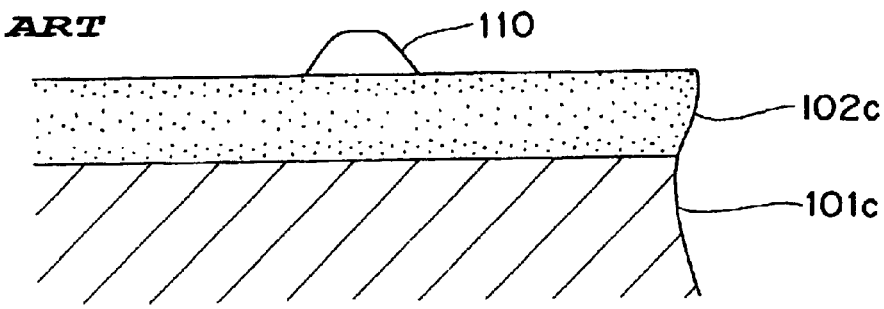
Figure 8:
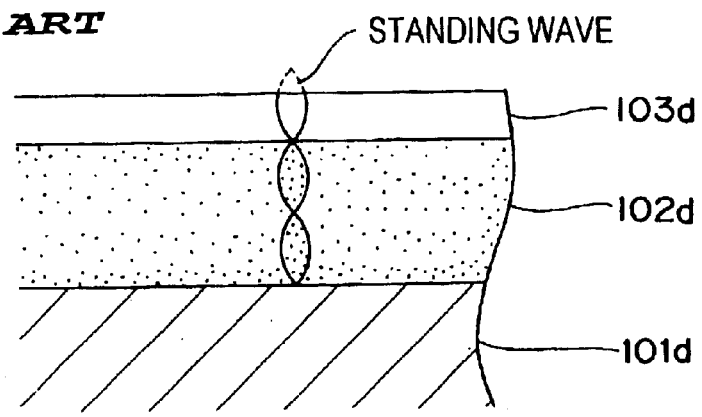
FIG. 8 is a schematic view of another prior art example using a crosslinking substance layer.

In the foregoing embodiments, when a photoresist is exposed to a laser beam for recording a signal as shown in FIG. 1F, a base disc 101c is made of material such as nickel having high reflection index whereas a crosslinkable substance layer 102c and a resist layer 103c are made of approximately transparent material with the crosslinkable substance layer 102c having a thickness of less than λ/2. Therefore, a standing wave having a node at the surface of a base disc 101c may be generated as shown in FIG. 7A. Since an image is formed on the resist layer 103c by this exposure, a boundary surface between the crosslinkable substance layer 102c and the resist layer 103c is present at a position close to an antinode of the standing wave as shown in FIG. 7A, and then, a bottom portion of a formed bump 110 has a maximum optical intensity so that such a bump 110 may be formed into a foot-spread cross-sectional shape as shown in FIG. 7B. A disc including pits having foot-spread cross-sectional shapes is undesirable because signals are leaked and entered from an adjacent track in playback. In such a disc, the modulation factor of a playback signal becomes small, resulting in insufficient modulated signals. In addition, in the foregoing embodiments, when the interface between a crosslinking substance layer 102d and a resist layer 103d is distant by one wavelength of the standing wave as shown in FIG. 8, a beam that has focused on the surface of a base disc 101d forms a considerably blurred image at the interface, making it impossible in some cases to form bumps of a desirable shape. If the depth of focus is defined as falling under a range of 50% or more of the optical intensity at the focal position on the optical axis, then the depth of focus $f_d$ can be expressed by the following equation:

$$f_d = \pm \lambda / \pi (NA)^2$$

where λ is the laser beam wavelength and NA is the numerical aperture of the recording lens. Given a laser beam wavelength of 351 nm and a recording-lens NA value of 0.9, the depth of focus becomes ±0.138 μm. If the refractive index of the crosslinking substance is 1.6, then one wavelength of the standing wave in FIG. 8 is 219 nm, which largely exceeds the depth of focus. When the focal position is set coincident with the interface between the crosslinking substance layer 102d and the resist layer 103d in order to prevent the above defocusing, then the beam would be defocused at the surface of the base disc 101d, and a reflected beam of the resulting blurred image would impinge on the resist. In this case also, bumps to be formed would be accompanied by occurrence of the foot-spread phenomenon. That is, with this structure, there is a possibility that the resist bumps may be formed into a foot-spread cross-sectional shape due to the effects of the standing wave that occurs to the surface of the nickel base disc in the recording process.

Accordingly, the following embodiment is intended to solve the above issue and to provide a blank disc for making a direct stamper, as well as the direct stamper and its manufacturing method, capable of preventing the resist bumps from being formed into a foot-spread cross-sectional shape.

Figure 5A:
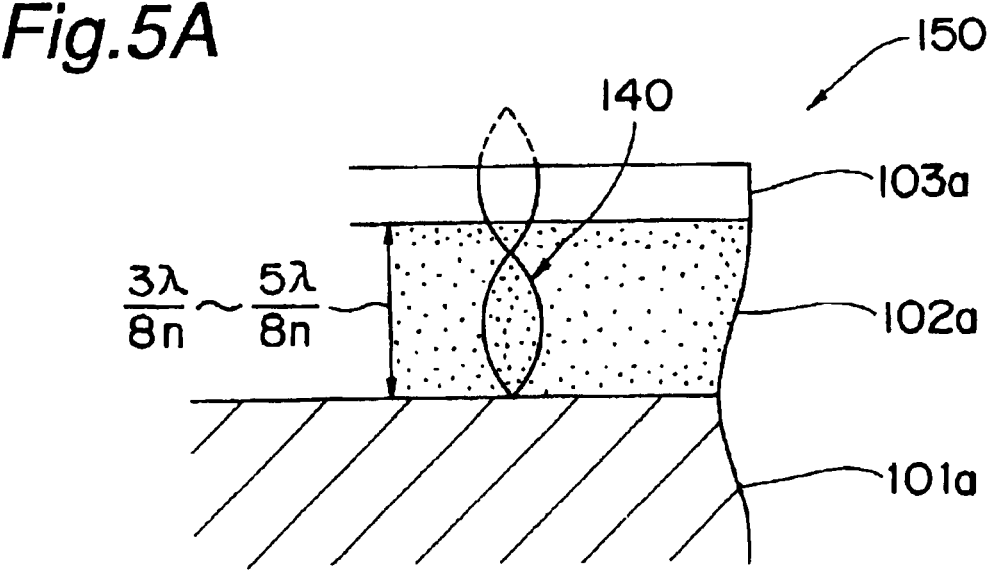
FIGS. 5A and 5B are schematic views showing steps of its manufacturing method according to a sixth embodiment of the present invention, and showing a blank disc for manufacturing a direct stamper, and the direct stamper, respectively.
Figure 5B:
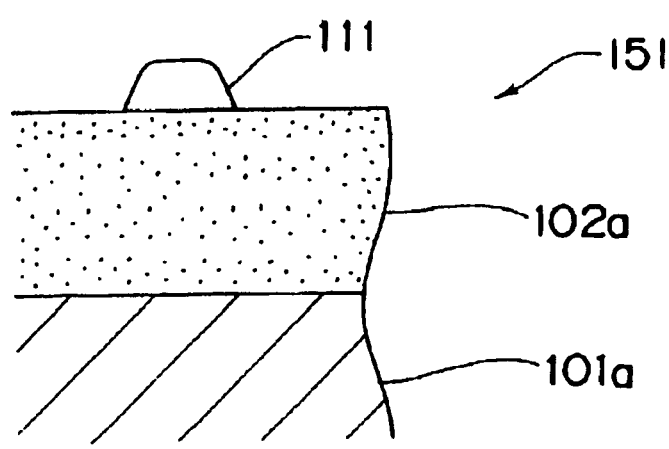

A blank disc 150 for manufacturing a direct stamper 151 for molding optical discs according to the sixth embodiment of the present invention, as shown in FIGS. 5A and 5B and FIGS. 9 to 10, is made up by arranging a crosslinking substance layer 102a and a photoresist layer 103a one by one on a base disc 101a. The photoresist layer 103a of this blank disc 150 is selectively irradiated with a laser beam 140 modulated by a recording signal, making the photoresist layer 103a exposed thereto and thereby forming exposed portions 103x. Thereafter, the photoresist is developed, and photoresist of unexposed portions 103y is removed while photoresist of the exposed portions 103x is left. Furthermore, crosslinking reaction is caused to occur between the crosslinking substance layer 102a and bumps 111 of the photoresist of the exposed portions 103x left in correspondence to the recording signal, thereby fixing the photoresist bumps 111 on the crosslinking substance layer 102a. Thus, the direct stamper 151 for molding optical discs is manufactured As shown in FIGS. 5A and 5B, the blank disc 150 is so set that if the refractive index of the crosslinking substance of the crosslinking substance layer 102a is n and the wavelength of the laser beam 140 is $\lambda$, then the thickness of the crosslinking substance layer 102a falls under a range of from $3\lambda/8n$ to $5\lambda/8n$. In this case, the interface between the crosslinking substance layer 102a and the resist layer 103a is positioned generally close to a node of the standing wave formed by the laser beam 140 being reflected by the base disc 101a. Therefore, the exposure intensity at bottom face portions of the bumps 111 becomes smaller, so that the bumps 111 formed after the development are free from any foot spread and thus shaped with enough slope angle.

As an example of the crosslinkable substance for the crosslinkable substance layer 102a, organic polymers such as phenol-resin or polyvinyl-phenol-resin based photoresists are available.

Next, with reference to FIGS. 9A to 9G and FIGS. 10H to 10J, the manufacturing process for the direct stamper 151 according to the sixth embodiment is described in detail.

Figure 9A:
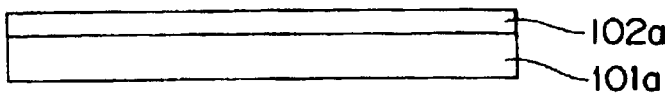
FIGS. 9A, 9B, 9C, 9D, 9E, 9F and 9G are step views of the manufacturing method for the direct stamper according to the sixth embodiment of the present invention.

FIG. 9A shows a state that a crosslinkable substance has been applied onto a base disc 101a of nickel or the like. The thickness of the applied crosslinking substance layer 102a is set to be within a range of $3\lambda/8n$ to $5\lambda/8n$ as described above. The base disc 101a may be made of such metals as nickel alloy, silicon, aluminum, and copper in addition to nickel, or glass, ceramics, or the like in addition to the above-mentioned metals.

Figure 9B:
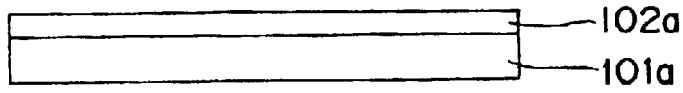

FIG. 9B shows a baking process step subsequent to the above application step. The crosslinkable substance of the crosslinkable substance layer 102a, if among those which are crosslinked by heat, is caused to crosslink by this baking process. Also, in some types of crosslinkable substances, such as chemical-amplification type resist, the crosslinking substance generates an acid when exposed to light, and yields crosslinking with this acid serving as a catalyst in the subsequent baking process. In such a case, a baking process of FIG. 9B is performed at a relatively low temperature of 80° C. to 90° C. as a pre-baking aimed at evaporating the solvent after the application.

Figure 9C:
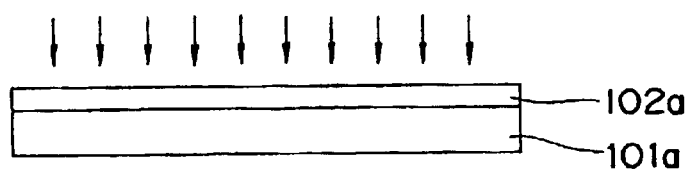
Figure 9D:
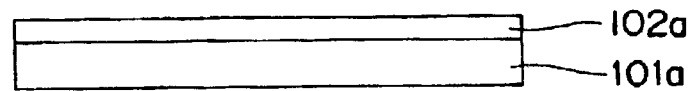
Figure 9E:
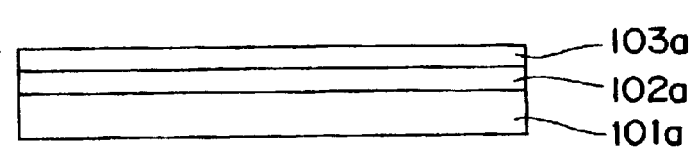

Subsequently, as shown in FIG. 9C, ultraviolet radiation is applied to the entire base disc 101a, and through a baking process shown in FIG. 9D, by which polymer chains are bridged. FIG. 9D shows a baking after the exposure, which is so called post-exposure baking. In this process, crosslinking reaction occurs while the acid generated by the exposure acts as a catalyst.

In either case, the crosslinking reaction of the crosslinkable substance at this stage is intended not to fulfill a complete crosslinking but to render a partial crosslinking. The partial crosslinking is of such a degree that when photoresist is applied onto the crosslinking substance layer 102a at the step of subsequent FIG. 9E to form the photoresist layer 103a, the crosslinking substance does not dissolve into the solvent of the photoresist, that is, the crosslinking substance is substantially not attacked by the solvent. Generally, organic polymers become insoluble in a solvent as crosslinking progresses to several percents. As the photoresist of the photoresist layer 103a of FIG. 9E, a negative-type resist is used. However, a photoresist which is a positive-type resist originally may be used as a negative-type one by a method known as so-called image reversal method. In this case, the crosslinking substance of the crosslinking substance layer 102a, in its several-percent crosslinked state, is never attacked by the solvent of the photoresist.

Figure 9F:
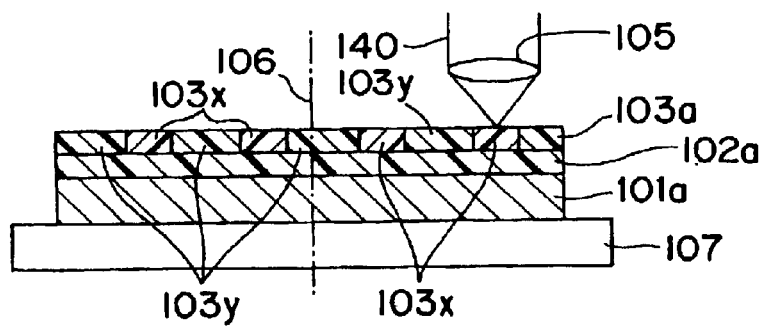

Next, as shown in FIG. 9F, a laser beam 140 modulated by a signal to be recorded is irradiated to the photoresist layer 103a, making the photoresist layer 103a exposed to light. The irradiation apparatus used in this process is one called laser beam recorder, and only partly shown in FIG. 9F, where out of the laser beam recorder are shown the laser beam 140 that has already been modulated by a signal to be recorded, a recording lens 105 for converging the laser beam 140 to a fine spot of $0.3\mu$ or so, and a rotation driving member 107 for rotating the base disc 101a around a rotating shaft 106. Since the recording lens 105 moves along a radial direction of the base disc 101a being rotated by the rotation driving member 107, a spiral-shaped latent image is recorded in the photoresist layer 103a as the laser beam 140 is irradiated spirally to the photoresist layer 103a.

Figure 9G:
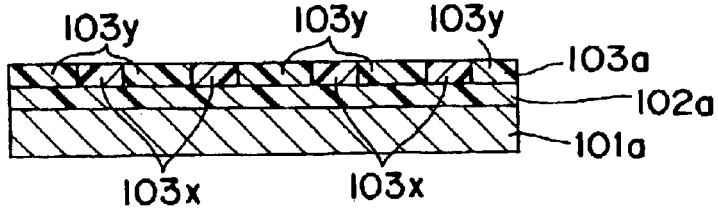

FIG. 9G shows a baking process after the exposure. This baking process causes the crosslinking reaction of the photoresist to progress while the acid generated at the exposed portions 103x by the exposure acts as a catalyst. This photoresist is a resist of the type which is generally called chemical-amplification type resist. In addition, in some types of resist, the need for post-exposure baking is eliminated.

Figure 10H:
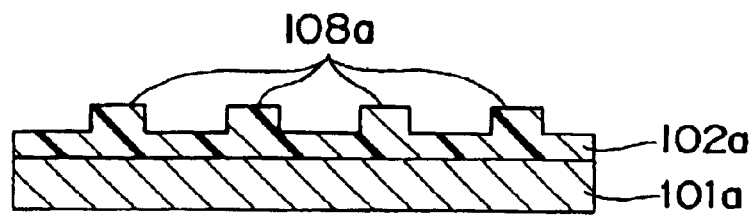
FIGS. 10H, 10I and 10J are step views of the direct stamper manufacturing method subsequent to FIG. 9G.

FIG. 10H shows a subsequent development process, where portions of the photoresist other than its crosslinked portions have been fused and flown away. As a result, the exposed portions 103x remain as resist bumps 108a. In this state, the resist bumps 108a and the crosslinking substance layer 102a have not yet been strongly bonded together.

Figure 10I:
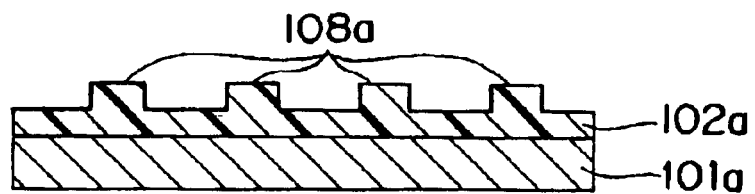

FIG. 10I shows a step of further accelerating the crosslinking between the crosslinking substance layer 102a and the resist of the resist bumps 108a. As described before, the crosslinking substance of the crosslinking substance layer 102a has not yet been crosslinked completely. Also, the crosslinking of the resist of the resist bumps 108a exposed to the laser beam 140 have progressed only partly. By making the crosslinking of the two members further progress by this step, mutual crosslinking between the resist polymer of the resist bumps 108a and the crosslinking substance is caused to occur, strengthening the bond therebetween. Also, the two members are further strengthened by the crosslinking, giving such a strength that the members can withstand heat and stress involved in the molding of optical discs. One of concrete methods for the crosslinking is to expose the post-development base disc as a whole into plasma. As the plasma, plasma of fluorine gas or the like is effective. Since exposing resist into plasma would cause the resist itself to be whittled by ions or radicals in the plasma, the exposure time needs to be suppressed to several seconds or so. The resist subjected to plasma processing for several seconds in this way is hardened to its interior, thus improved in strength and thermal resistance.

Another method for crosslinking is to accelerate the crosslinking by deep ultraviolet irradiation applied to the post-development base disc 101a and by subsequent baking. In the case of chemical-amplification type resist, crosslinking is accelerated by performing the baking process after the ultraviolet irradiation. In the case of novolac resin other than chemical-amplification type ones, it is known that deep ultraviolet irradiation, when applied in the state that moisture content in the resist had been dissipated by baking process, makes the crosslinking further progress. As an example, with a chemical-amplification type resist used as the photo-resist and the crosslinkable substance of the crosslinkable substance layer 102a, deep ultraviolet irradiation was applied to the post-exposure base disc 101a, and thereafter a baking process at a temperature between 110 to 250° C. was performed. In this case also, crosslinking of the crosslinking substance and the resist of the photoresist layer 103a progressed, and the heat-resistant temperature of the base disc 101a as a whole was increased to not less than 250° C.

Figure 10J:
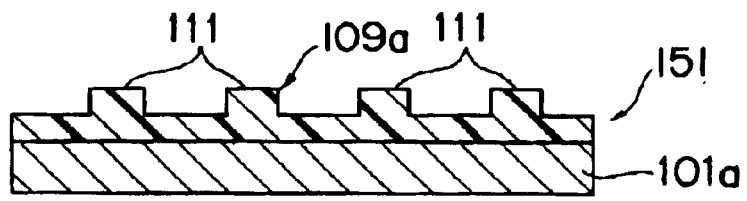

FIG. 10J shows the base disc 101a after the crosslinking, where the resist bumps 108a and the crosslinking substance layer 102a have been formed into a monolithic structure 109a. Bumps of this monolithic structure 109a are the bumps 111 as described above. The monolithic structure 109a is machined in its inner and outer diameters so as to match the mold of the molding machine, and then polished in its rear surface as required, by which a stamper for molding of optical discs is completed.

As a result of performing a molding experiment for molding optical discs with the use of the stamper manufactured by the above manufacturing method, no lacks of bumps 111 of the stamper were observed even with the number of production of optical discs over 100,000 shots.

In a Working Example 1 according to this sixth embodiment, a laser beam of krypton having a wavelength of 351 nm was used as the laser beam, an organic polymer having a refractive index of about 1.6 was used as the crosslinking substance, and the thickness of the crosslinking substance layer was set to 83 to 137 nm. As a result, successful resist bumps were obtained. As an example of the organic polymer, phenol-resin based photoresist was used.

Figure 11:
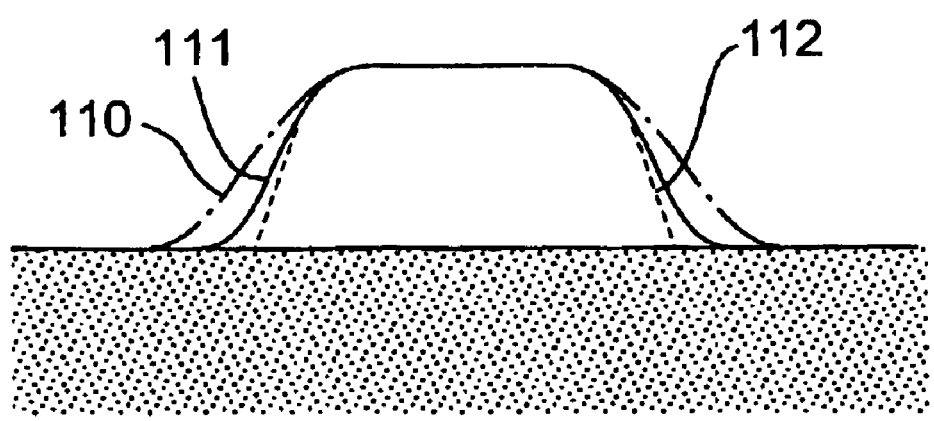
FIG. 11 is an enlarged view of a bump having a foot spread, shown in one-dot chain line, and a bump having no foot spread, shown in solid line, the bumps being overlaid on each other, for an easier, clearer understanding of the two cases where the foot spread is present and absent.

In the above blank disc 150 as well as the stamper 151 made by using the blank disc 150 according to the sixth embodiment, since the thickness of the crosslinking substance layer 102a is within the range of $3\lambda/8n$ to $5\lambda/8n$, the interface between the crosslinking substance layer 102a and the resist layer 103a is positioned generally close to a node of the standing wave formed by the laser beam 140 being reflected by the base disc 101a. Therefore, the exposure intensity at bottom face portions of the bumps 111 becomes smaller, so that the bumps 111 formed after the development are free from any foot spread and thus shaped with enough slope angle between 40–60°. Thus, a played-back signal more successful in jitter and modulation factor than conventional was obtained. As a result of this, it becomes possible to increase the number of shots up to 100,000 or more, compared with the prior art. However, it is not the case that the increased slope angle caused the number of shots to increase, but the case is rather likely to be converse. Notwithstanding, numbers of shots of 100,000 or more are possible even with the increased slope angle. Further, as a result of this, the resist bumps 111 can be shaped with a slope of an ideal angle θ free from any foot spread, and therefore played-back signal characteristics can be improved. As an example of the ideal angle θ free from any foot spread, the slope angle θ of the side face, as viewed in the cross-sectional shape, needs to be 40° or more, and preferably, an angle of 50° to 60° is desirable also in terms of the played-back signal characteristics. For a clearer, easier understanding of the cases where a foot spread is present and where not, FIG. 11 shows an enlarged view of a bump having a foot spread, shown in one-dot chain line, and a bump having no foot spread, shown in solid line, the bumps being overlaid on each other. Further, the pit width of optical discs can be reduced to the extent of the absence of any foot spread in the shape of the bumps 111, so that higher-density discs can be produced.

(Seventh Embodiment)

Figure 6A:
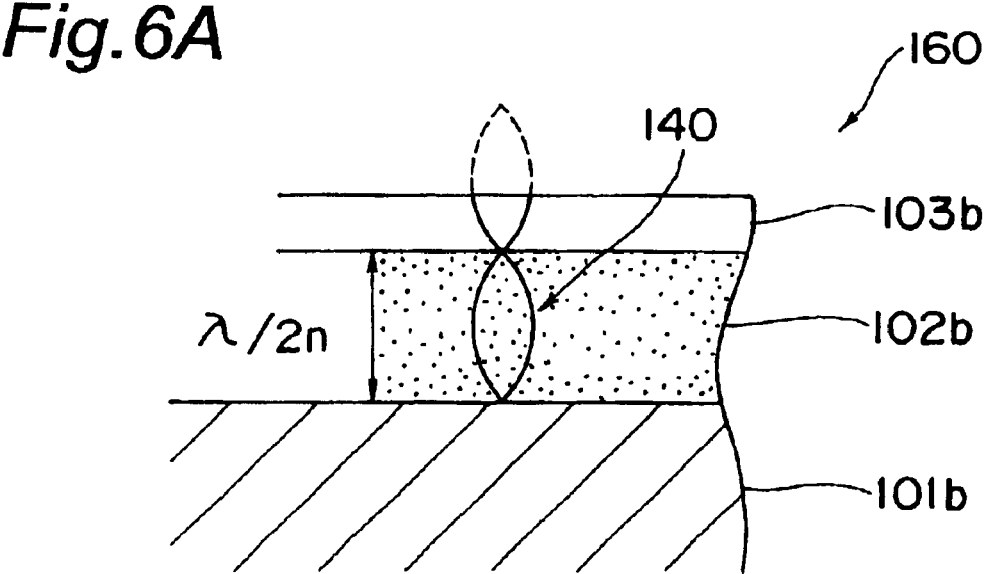
FIGS. 6A and 6B are schematic views showing steps of its manufacturing method according to a seventh embodiment of the present invention, and showing a blank disc for manufacturing a direct stamper, and the direct stamper, respectively.
Figure 6B:
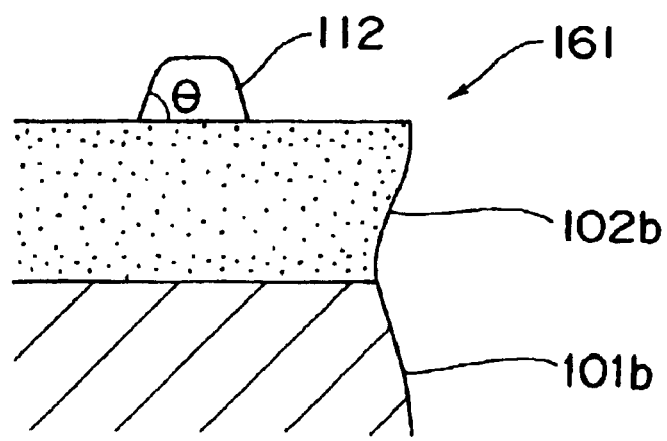

A blank disc 160 for manufacturing a direct stamper 161 according to a seventh embodiment of the present invention, differing in thickness from the blank disc 150 of the sixth embodiment, is made up by arranging a crosslinking substance layer 102b and a photoresist layer 103b one by one on a base disc 101b as shown in FIGS. 6A and 6B, where the difference is that the thickness of the crosslinking substance layer 102b is $\lambda/2n$ and the rest of constitution and steps is generally of the same ones.

More specifically, the photoresist layer 103b of this blank disc 160 is selectively irradiated with a laser beam 140 modulated by a recording signal, making the photoresist layer 103b exposed thereto and thereby forming exposed portions (see the exposed portions 103x in FIG. 9). Thereafter, the photoresist is developed, and the photoresist of unexposed portions (see the unexposed portions 103y in FIG. 9) is removed while the photoresist of the exposed portions is left. Furthermore, crosslinking reaction is caused to occur between the crosslinking substance layer 102b and bumps 112 of the photoresist of the exposed portions left in correspondence to the recording signal, thereby fixing the photoresist bumps 112 on the crosslinking substance layer 102b. Thus, a direct stamper 161 for molding optical discs is manufactured.

As shown in FIGS. 6A and 6B, the blank disc 160 is so set that if the refractive index of the crosslinking substance of the crosslinking substance layer 102b is n and the wavelength of the laser beam 140 is $\lambda$, then the thickness of the crosslinking substance layer 102b is $\lambda/2n$. In this case, the, interface between the crosslinking substance layer 102b and the resist layer 103b is positioned generally at a node of the standing wave formed by the laser beam 140 being reflected by the base disc 101b. Therefore, the exposure intensity at bottom face portions of the bumps 112 becomes smaller than in the sixth embodiment, so that the bumps 112 formed after the development are free from any foot spread and thus shaped with enough slope angle.

As an example of the crosslinking substance for the crosslinking substance layer 102b, the same organic polymers as the materials of the photoresist layer 103b are available.

In a Working Example 2 according to this seventh embodiment, when an organic polymer having a refractive index of about 1.6 is used as the crosslinking substance, the crosslinking substance layer becomes about 110 nm thick under the recording conditions of the Working Example 1 of the sixth embodiment. When a stamper was manufactured under these conditions and with the same material as that of the resist layer 103b used as the organic polymer serving as the crosslinking substance of the crosslinkable substance layer, slope angles θ of about 50° to 55° of the bumps 112 were obtained. Further, whereas the jitter of played-back signals is standardized as 8% or less, the resulting stamper showed a jitter of 6.6%. Also, no peeling of the bumps and the crosslinking substance layer was observed even with the number of molded optical discs molded by the stamper being over 100,000 shots.

In the blank disc 160 as well as the stamper 161 made by using this blank disc 160 according to the seventh embodiment, since the thickness of the crosslinking substance layer 102b is set to $\lambda/2n$, the interface between the crosslinking substance layer 102b and the resist layer 103b is positioned generally at a node of the standing wave formed by reflection by the base disc 101b. Therefore, the exposure intensity at bottom face portions of the bumps 112 becomes smaller, so that the bumps 112 formed after the development are free from any foot spread and thus shaped with enough slope angle as shown in FIG. 11. Thus, the number of molding shots for optical discs can be increased to a large extent, compared with the conventional manufacturing method. Whereas only up to about 5,000 optical discs could be molded with conventional stampers, it has become possible to achieve 100,000 or more optical discs according to the seventh embodiment. Further, as a result of this, the resist bumps 112 can be shaped with a slope of an ideal angle θ free from any foot spread, and therefore played-back signal characteristics can be improved. As an example of the ideal angle θ free from any foot spread, the slope angle θ of the side face, as viewed in the cross-sectional shape, needs to be 40° or more, and preferably, an angle of 50° to 60° is desirable also in terms of the played-back signal characteristics. Further, the pit width of optical discs can be reduced to the extent of the absence of any foot spread in the shape of the resist bumps 112, so that higher-density discs can be produced.

According to the present invention, since the thickness of the crosslinking substance layer is set within the range of $3\lambda/8n$ to $5\lambda/8n$ or set to $\lambda/2n$, the interface between the crosslinking substance layer and the resist layer is positioned generally close to a node or generally at a node of the standing wave formed by the reflection by the base disc. Therefore, the exposure intensity at bottom face portions of the bumps becomes smaller, so that the bumps formed after the development are free from any foot spread, thus making it impossible to realize an ideally angled slope of the bumps provided with enough slope angle. Thus, played-back signal characteristics can be improved. Further, the pit width of optical discs can be reduced to the extent of the absence of any foot spread in the shape of the resist bumps, so that higher-density discs can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for manufacturing a direct stamper, comprising:

forming a layer of a crosslinkable substance on a base disc;

partially crosslinking the layer of the crosslinkable substance by using a first crosslinking reaction to transform the crosslinkable substance to a crosslinking substance;

thereafter, forming a photoresist layer on the layer of the crosslinking substance;

subsequently, exposing the photoresist layer to a laser beam modulated by a signal to be recorded;

removing unexposed portions of the photoresist layer, causing exposed portions of the photoresist layer to remain as photoresist bumps; and thereafter, subjecting the layer of the crosslinking substance and the photoresist bumps to a second crosslinking reaction to substantially complete crosslinking of the layer of the crosslinking substance and the photoresist bumps.

2. The direct stamper manufacturing method according to claim 1, wherein the photoresist is a negative-type resist.

3. The direct stamper manufacturing method according to claim 1, wherein material of the base disc is nickel.

4. The direct stamper manufacturing method according to claim 1, wherein a wavelength of the laser beam is $\lambda$, a refractive index of the crosslinking substance is n, and a thickness of the layer of the crosslinking substance is between $3\lambda/8n$ and $5\lambda/8n$.

5. The direct stamper manufacturing method according to claim 1, wherein the second crosslinking reaction is generated by exposing the layer of crosslinking substance and the photoresist bumps to a plasma.

6. The direct stamper manufacturing method according to claim 1, wherein the crosslinking substance is partially crosslinked to several percents.

7. The direct stamper manufacturing method according to claim 1, further comprising the step of subjecting the photoresist layer to baking after the step of exposing the photoresist layer.

* * * * *

UNITED STATES PATENT AND TRADEMARK OFFICE
CERTIFICATE OF CORRECTION

PATENT NO.   : 6,927,016 B2
DATED        : August 9, 2005
INVENTOR(S)  : Kazuhiko Sano It is certified that error appears in the above-identified patent and that said Letters Patent is hereby corrected as shown below:

Title page,
Item [75], Inventor, delete "Hyogen-Ken" and insert -- Hyogo-Ken --.

Signed and Sealed this

Seventeenth Day of January, 2006

JON W. DUDAS
*Director of the United States Patent and Trademark Office*